(12) United States Patent
Danielson et al.

(10) Patent No.: US 10,989,341 B2
(45) Date of Patent: Apr. 27, 2021

(54) FLUID CONNECTORS WITH MODULAR CONNECTION STATE SENSORS

(71) Applicant: FasTest, Inc., Roseville, MN (US)

(72) Inventors: Robert Danielson, Roseville, MN (US); Jacob Chandler, Roseville, MN (US)

(73) Assignee: FasTest, Inc., Roseville, MN (US)

( * ) Notice: Subject to any disclaimer, the term of this patent is extended or adjusted under 35 U.S.C. 154(b) by 358 days.

(21) Appl. No.: 16/049,115

(22) Filed: Jul. 30, 2018

(65) Prior Publication Data
US 2019/0063651 A1 Feb. 28, 2019

Related U.S. Application Data

(60) Provisional application No. 62/549,688, filed on Aug. 24, 2017.

(51) Int. Cl.
*F16L 37/00* (2006.01)
(52) U.S. Cl.
CPC ......... *F16L 37/004* (2013.01); *F16L 2201/10* (2013.01)
(58) Field of Classification Search
CPC .............................. F16L 37/004; F16L 2201/10
USPC .................................................... 285/9.1, 93
See application file for complete search history.

(56) References Cited

U.S. PATENT DOCUMENTS

| | | | | |
|---|---|---|---|---|
| 2,967,640 A | * | 1/1961 | Roberts | G21C 13/06 220/316 |
| 4,869,562 A | * | 9/1989 | Kaes | B60T 15/028 303/119.2 |
| 6,206,240 B1 | * | 3/2001 | Osgar | B67D 7/0255 222/389 |
| 7,841,357 B2 | | 11/2010 | Rankin | |
| 8,844,979 B2 | | 9/2014 | Danielson | |
| 9,062,788 B2 | * | 6/2015 | Mainland | F16K 31/10 |
| 9,103,461 B2 | * | 8/2015 | Dahlgren | A62C 35/68 |
| 9,890,873 B2 | * | 2/2018 | Schwobe | F16K 31/0658 |

(Continued)

FOREIGN PATENT DOCUMENTS

JP 2017-032137 2/2017

OTHER PUBLICATIONS

International Search Report and Written Opinion, issued in the corresponding PCT application No. PCT/US2018/044354, dated Nov. 15, 2018, 12 pages.

*Primary Examiner* — Matthew Troutman
*Assistant Examiner* — Fannie C Kee
(74) *Attorney, Agent, or Firm* — Hamre, Schumann, Mueller & Larson, P.C.

(57) ABSTRACT

Quick connect fluid connectors with modular connection state sensors removably or detachably mounted thereon. Each modular connection state sensor is configured to sense a connection state of the fluid connector it is mounted on. The connection state sensor indicates that the fluid connector of the first fluid system is connected to the second fluid system prior to initiating fluid flow between the first and second fluid systems. The connection state sensor senses movements of one or more elements of the quick connect fluid connector that is involved in the actual connection of the fluid connector to the second fluid system. The elements that are sensed can be, for example, one or more cylindrical sleeves of the fluid connector or a piston of the fluid connector. Therefore, the connection state of the fluid connectors can be determined accurately.

6 Claims, 5 Drawing Sheets

(56) References Cited

U.S. PATENT DOCUMENTS

| | | |
|---|---|---|
| 2002/0002999 A1 | 1/2002 | Fukano et al. |
| 2006/0207345 A1 | 9/2006 | Rankin |
| 2007/0209716 A1* | 9/2007 | Rankin ............... F16K 37/0033 137/554 |
| 2017/0037991 A1 | 2/2017 | Danielson et al. |
| 2017/0224975 A1 | 8/2017 | Peer et al. |

* cited by examiner

FLUID CONNECTORS WITH MODULAR CONNECTION STATE SENSORS

FIELD

Quick connect fluid connectors are described, that include modular sensors for sensing a connection state of the fluid connectors

BACKGROUND

Quick connect fluid connectors are known for connecting fluid systems to one another to transfer fluids from one system to another. In fluid connectors, disconnection of the connector while transferring fluids needs to be avoided. Also, it is important to ensure that the connector is actually connected before processing occurs to avoid accidental disconnection once the fluid begins to flow.

U.S. Pat. No. 8,844,979 describes examples of quick connect fluid connectors that can be used for transferring fluids, including gaseous or liquid fluids, between first and second fluid systems.

U.S. Pat. No. 7,841,357 describes a fluid connector that uses a magnet and a sensor to sense movement of a piston. Based on the sensed movement of the piston, a connection state of the connector is estimated. In U.S. Pat. No. 7,841,357, an assumption is made that connection has been achieved based on piston movement. However, even though the piston may have moved to a fully open position, the connection member described therein may not have achieved proper connection to the mating coupler, for example due to a failure of the connection member or use of an improper mating coupler. Therefore, the fluid connector in U.S. Pat. No. 7,841,357 can still become disconnected under pressure even though complete movement of the piston has been detected.

U.S. Patent Application Publication 2017/0037991 discloses examples of the use of sensors on fluid connectors that sense the connection state of the fluid connectors.

SUMMARY

Quick connect fluid connectors with modular connection state sensors removably or detachably mounted thereon are described. The fluid connectors can be used to connect a first fluid system to a second fluid system for transferring fluids between the first and second fluid systems. As used herein, the term fluid can include gases, liquids or mixtures of both. The described quick connect fluid connectors can be used in any application where a fluid connector is used to connect a first fluid system to a second fluid system to transfer a fluid between the two systems.

Each modular connection state sensor is configured to sense a connection state of the fluid connector it is mounted on. The connection state sensor indicates that the fluid connector of the first fluid system is connected to the second fluid system prior to initiating fluid flow between the first and second fluid systems. The connection state sensor senses movements of one or more elements of the quick connect fluid connector that is involved in the actual connection of the fluid connector to the second fluid system. The elements that are sensed can be, for example, one or more cylindrical sleeves of the fluid connector or a piston of the fluid connector. Therefore, the connection state of the fluid connectors can be determined accurately.

The connection state sensors are modular allowing the same connection state sensor to be removed from one fluid connector and mounted on a different fluid connector. In one embodiment, a single standard shaped and sized modular connection state sensor can be used with different fluid connectors. The different fluid connectors can be different ones of the same type of fluid connector, for example fluid connectors that are similar in construction and function. The different fluid connectors can be different sizes of the same type of fluid connector, for example fluid connectors that are similar in construction and function but have different sizes to accommodate different fluid systems, different fluid flow rates, or different forms of connection. The different fluid connectors can also be different from one another in construction and function. In another embodiment, the shape of the modular sensor can be changed such that the sensor can conform to different fluid connectors.

In one embodiment, some or all of a housing of the modular connection state sensor is made translucent or transparent to allow viewing of one or more sensor lights embedded within the housing that indicates, for example, a connection state of the fluid connector. This allows a user to visually see illumination (or non-illumination) of the one or more sensor lights, thereby providing a visual feedback to the user of the connection state of the fluid connector.

In addition, by making the connection state sensor modular, the size and shape of the connection state sensor can be adapted to future/other technologies to include other sensing capability, wireless, etc. The modular connection state sensor can be molded into a larger form by extending out the top or sides of the sensor.

DRAWINGS

DETAILED DESCRIPTION

Figure 1:
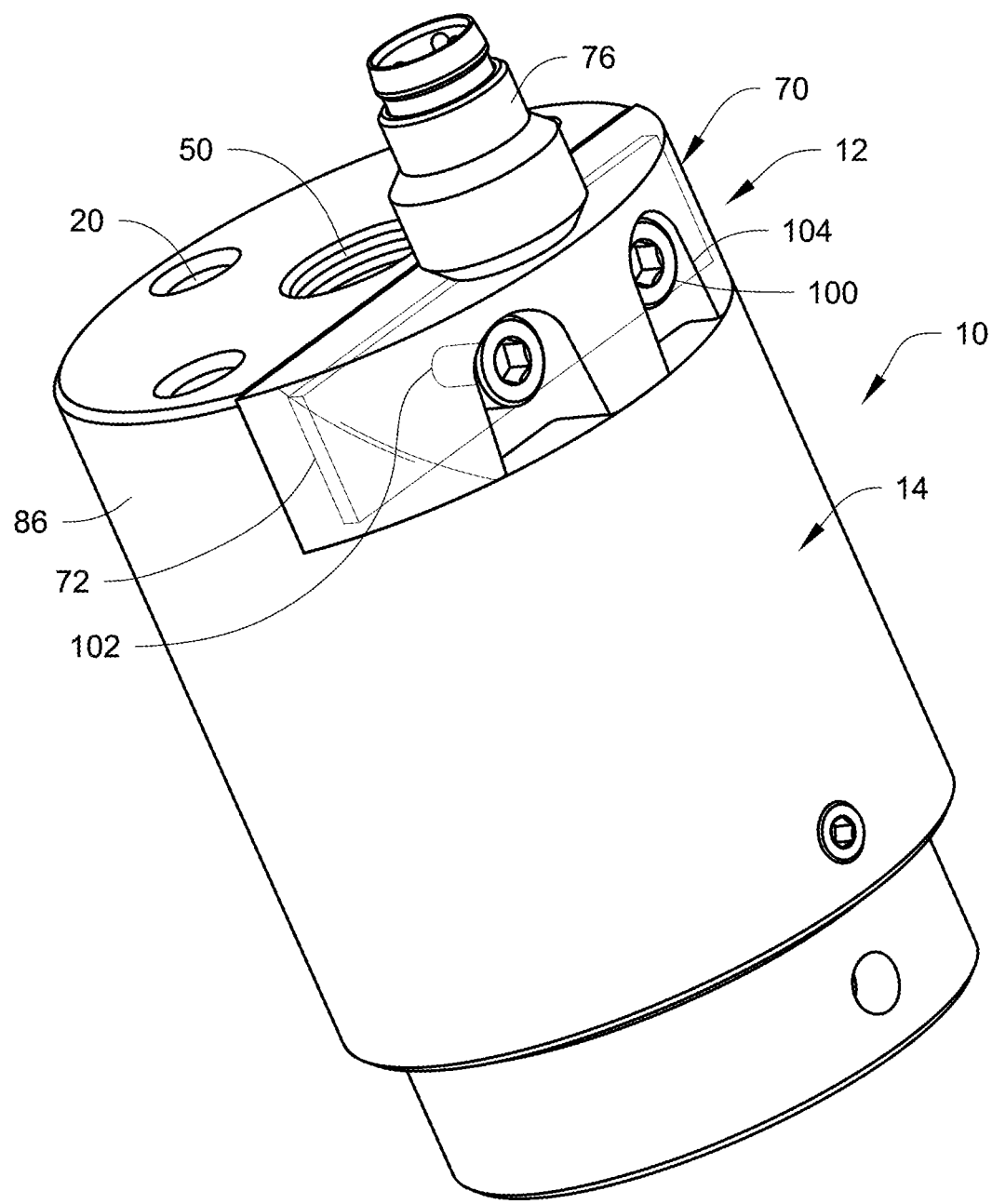
FIG. 1 is a perspective view of one embodiment of a quick connect fluid connector with one embodiment of a modular connection state sensor described herein.

As used throughout this patent application, including the claims, unless otherwise defined, the term fluid can include gases, liquids or mixtures of both.

The described quick connect fluid connectors with modular connection state sensors can be used in any application where a fluid connector is used to fluidly connect a first fluid system to a second fluid system to transfer a fluid between the two systems. The fluid connectors can be the type disclosed in U.S. Patent Application Publication 2017/0037991 which is incorporated herein by reference in its entirety. In addition, the fluid connectors on which the modular connection state sensors described herein may be used include on any of the fluid connectors available from FasTest Inc. of Roseville, Minn. such as: the FE Series fluid connectors that are designed to externally connect and seal with a tube; the FI Series fluid connectors that are designed to internally connect and seal with a tube; any of the G-Series fluid connectors used for filling gas cylinders; the FasMate fluid connectors (for example the FN and FX Series) that connect to internal or external threads; the 60 or 70 Series fluid connectors; and many others. Many other applications of the described fluid connectors and modular connection state sensors are possible.

In the fluid connectors described further below, one or more modular connection state sensors are provided for sensing a connection state of the fluid connectors. The modular connection state sensors (or "sensors" for short) described herein monitor one or more internal components of the fluid connectors to indicate that the fluid connectors of the first fluid system are connected to the second fluid system prior to initiating fluid flow between the first and second fluid systems. The modular sensors are arranged on the fluid connectors to sense movements of one or more elements of the fluid connectors that are involved in the actual connection of the fluid connectors to the second fluid system. This permits the connection state of the fluid connectors to be determined accurately.

Referring to FIGS. 1-4, an example of a fluid connector 10 with a modular connection state sensor 12 is illustrated. In use, the fluid connector 10 is mechanically and fluidly connected to a first fluid system via a fluid line 5. In the connector 10, a pneumatic actuated piston (described further below) squeezes a rubber seal to extrude the rubber seal against a mating part 7 of a second fluid system so that the fluid connector 10 grips the mating part 7. As air pressure is introduced into a pilot port in the connector 10, the piston is energized and squeezes the rubber seal until it contacts the mating part 7. The movement of the piston (or other suitable component of the fluid connector 10) is monitored by the sensor 12 such that it can be determined when the connector 10 is fully actuated and in gripping contact with the mating part 7. To accomplish this, a magnet is spring loaded into engagement with the piston so that as the piston moves the magnet moves with therewith. As the magnet moves, the magnetic intensity is detected by the sensor 12 and the magnetic intensity is associated with the piston travel.

Figure 4:
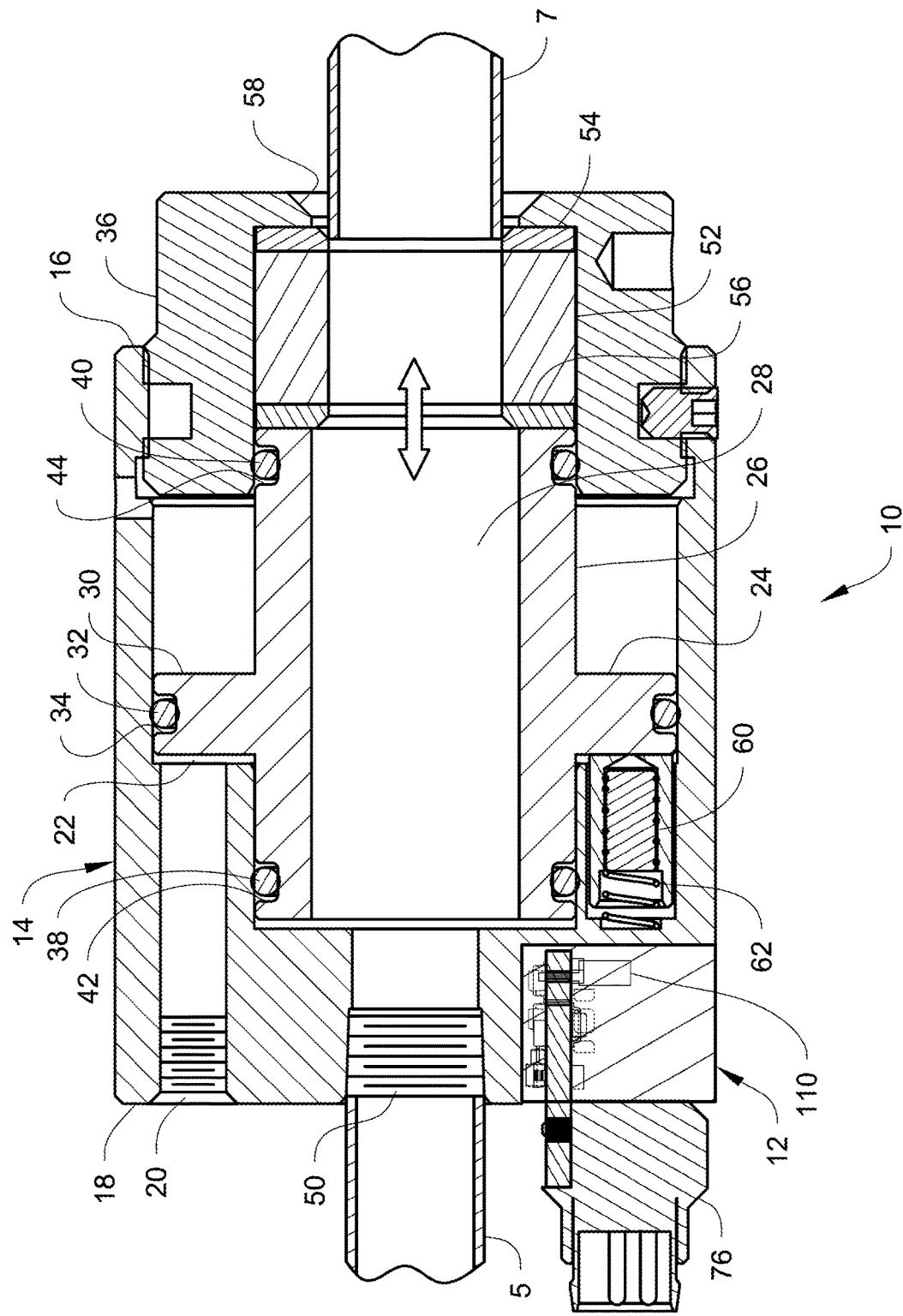
FIG. 4 is a cross-sectional view of the fluid connector with attached modular connection state sensor.

The fluid connector 10 includes an outer cylindrical housing (also referred to as a connector housing) 14 having a front end 16 and a rear end 18. The housing 14 can be formed of a material such as metal or plastic. A pilot port 20 is formed in the rear end 18 through which air or other piston actuating fluid can flow in communication with a cavity 22 on one side of a piston 24 for actuating the piston 24 in a forward direction or toward the front end 16 as indicted by the double headed arrow in FIG. 4. Return movement of the piston 24 (or movement in a rearward direction) to the position shown in FIG. 4 is provided by a seal (discussed below) returning to its default shape. The fluid connector 10, minus the modular connection state sensor 12 and the magnet described below, is similar in construction to the FE Series fluid connectors that are available from FasTest Inc. of Roseville, Minn.

The piston 24 is slidably disposed within an interior of the housing 14. The piston 24 is a linearly movable part that is part of a connection mechanism of the fluid connector 10 that detachably connects the fluid connector 10 to the mating part 7. The piston 24 includes a cylindrical body 26 that defines a fluid passageway 28 through the body 26. A larger diameter circumferential rim 30 is integrally formed on the body 26 and projects radially outward therefrom. A perimeter of the rim 30 is closely adjacent to an interior surface of the housing 14, and a seal 32, for example an elastomeric o-ring, can be disposed in a channel 34 formed in the edge of the rim 30 to seal with the interior surface of the housing 14 and prevent fluid leakage out of the cavity 22 past the rim 30. In addition, the outside surface of the body 26 is closely adjacent to an interior surface of the housing 14 and to an interior surface of a front sleeve 36, and seals 38, 40, for example elastomeric o-rings, can be disposed in channels 42, 44 formed at opposite ends of the body 26 to seal with the interior surfaces and prevent fluid leakage past the seals 38, 40.

A fluid port 50 formed in the rear end 18 is in fluid communication with the fluid passageway 28 through the body 26 to allow fluid to pass between the passageway 28 and the port 50. The fluid line 5 is connected to the port 50.

The front sleeve 36 is partially disposed within the housing 14 with a front end of the sleeve 36 extending from the front end 16 of the housing 14. The sleeve 36 forms part of the connection mechanism for connecting the fluid connector 10 to the mating part 7, such as a tube, through which a fluid can flow to and from the fluid connector 10.

The connection mechanism also includes a seal 52, for example a rubber seal that is disposed between a pair of washers 54, 56. The washer 54 is disposed between the front end of the seal 52 and a flange 58 projecting radially inwardly from the sleeve 36. The washer 56 is disposed between the rear end of the seal 52 and the end of the body 26.

When the piston 24 is actuated to the right in FIG. 4 by introducing pressurized air or other fluid through the pilot port 20, the pressurized air enters the cavity 22 and acts against the piston 24. The piston 24 is thereby actuated to the right so that the piston 24 pushes against the washer 56, squeezing the seal 52 between the washers 54, 56. The seal 52 is made of sufficiently resilient material to allow the seal 52 to extrude radially inward when it is squeezed between the washers 54, 56. When the seal 52 is extruded radially inward, it seals with and grips around the mating part 7. This sealing and gripping action on the mating part 7 is known in the art from the FE Series fluid connectors mentioned above.

As seen in FIG. 4, a magnet 60 is movably disposed in an aperture formed in the housing 14. A biasing member 62, for example a non-magnetic coil spring, is disposed between the magnet 60 and the housing 14 that biases the magnet 60 into continuous engagement with the piston 24. Therefore, as the piston 24 moves back and forth, the magnet 60 moves therewith. The movements of the magnet 60 can be sensed by the sensor 12 by detecting the magnetic intensity relative to the sensor 12. The use of a sensor to sense magnetic intensity of a magnet and thereby determine relative positions between the sensor and the magnet is known in the art. In another embodiment, the magnet 60 could be mounted directly on the piston 24, for example on the body 26 or on the rim 30, with the movements of the magnet 60 being sensed by the sensor 12.

Referring to FIGS. 1-4, the sensor 12 includes a sensor body 70. The sensor body 70 is configured to detachably connect to the housing 14, for example at the rear end 18. The sensor body 70 contains the sensing element(s) and electronics used to sense movement of the magnet 60 which generates one or more signals that can be interpreted by logic on a sensor chip 72 in the sensor body 70 to determine the relative positions of the magnet 60 (and thus the piston 24) relative to the sensing element. A signal, which indicates a connection status or connection quality signal, can then be generated by the logic on the sensor chip 72 to indicate a good or a bad connection based on the sensed relative positions, and the signal can be relayed to a monitoring device (not shown) external to the connector 10 via a wire 74 (see FIG. 5) that connects to a connection 76 of the sensor body 70. In other embodiments, signals from the sensor can be transmitted from, as well as to, the sensor 12 wirelessly via a suitable transmission mechanism, for example a transceiver (not shown) in the sensor 12.

Figure 2:
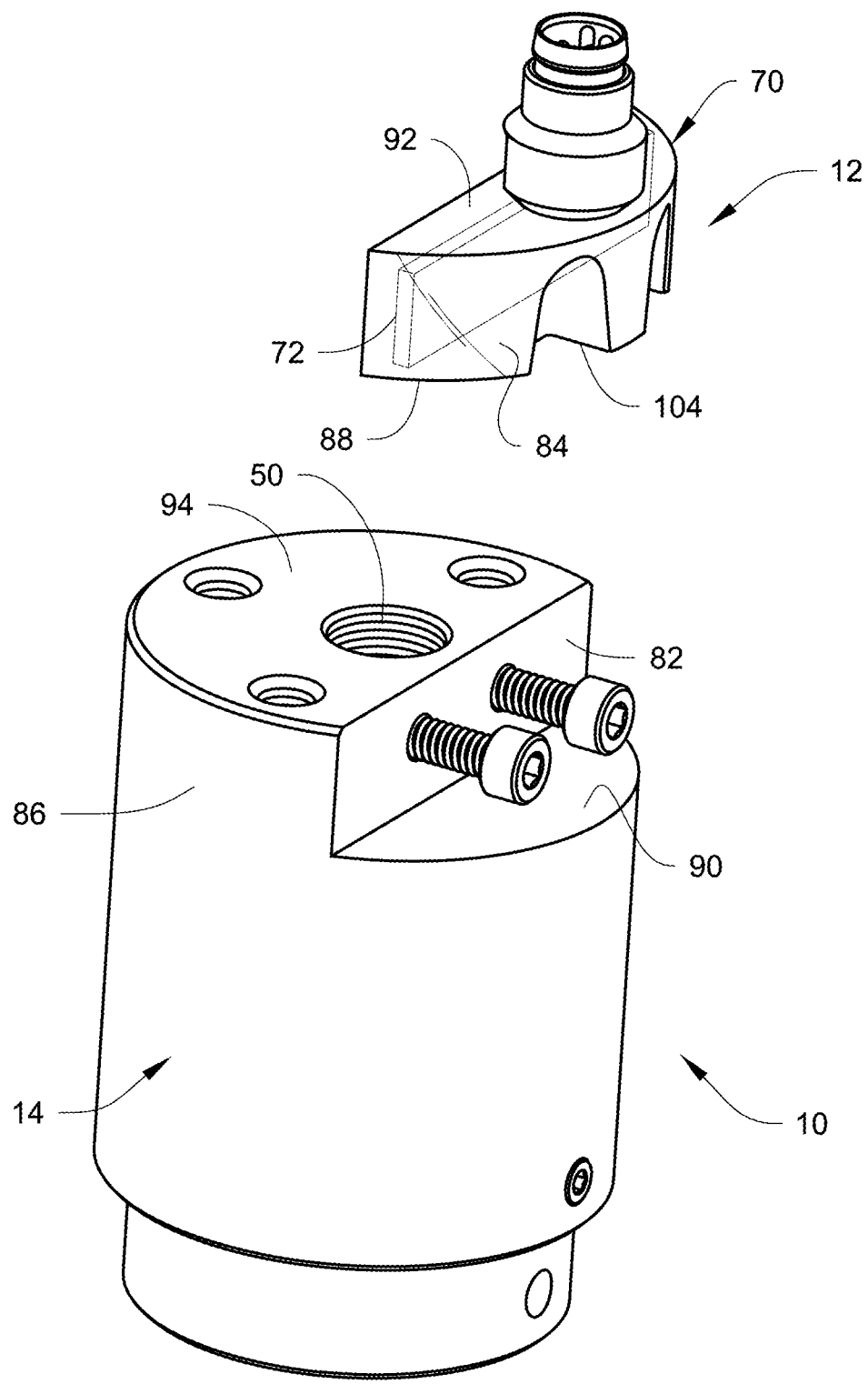
FIG. 2 is a perspective, exploded view showing the modular connection state sensor of FIG. 1 detached from the fluid connector.
Figure 3:
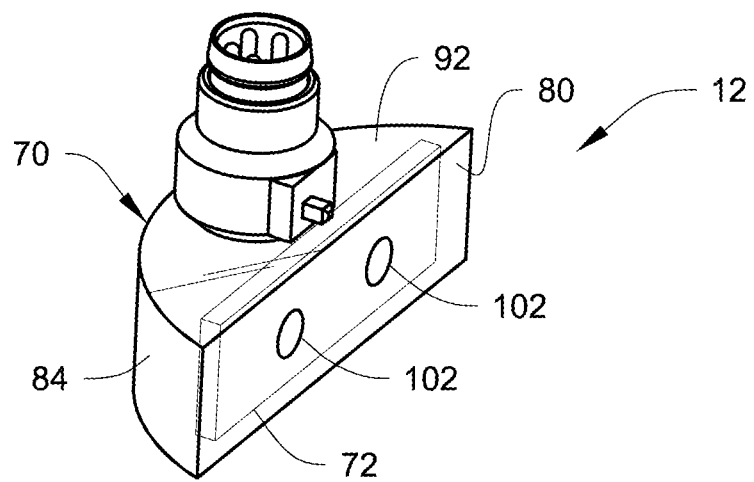
FIG. 3 is another perspective, exploded view from another angle showing the modular connection state sensor of FIG. 1 detached from the fluid connector.
Figure 3:
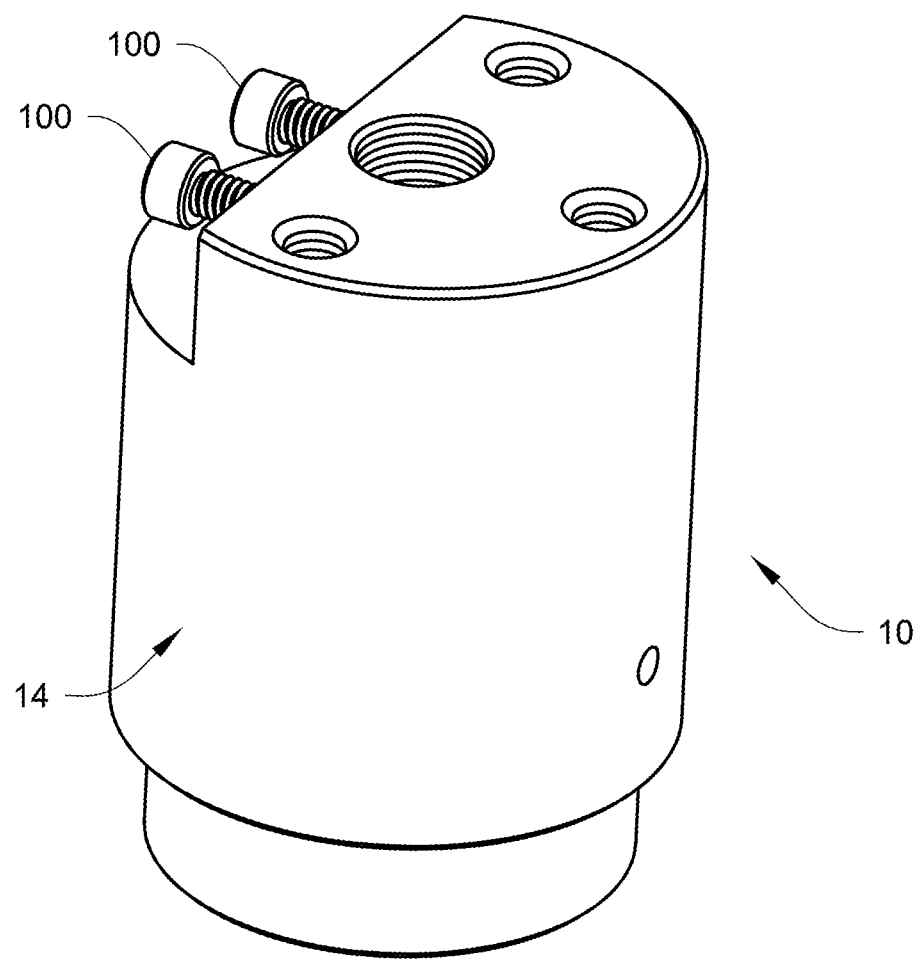

In one embodiment, the sensor body 70 can form a continuation of one or more portions of outer surfaces of the housing 14. For example, as best seen in FIGS. 1-3, the sensor body 70 can have a semi-cylindrical shape with a generally flat or planar radially inner side 80 that interfaces with a generally flat or planar surface 82 on the housing 14, a radially outer curved surface 84 that is generally flush with and forms generally a smooth continuation of the outer surface 86 of the housing 14, a generally flat or planar inner axial side 88 that interfaces with a generally flat or planar surface 90 on the housing 14, and a generally flat or planar outer axial side 92 that interfaces with a generally flat or planar end surface 94 at the rear end 18 of the housing 14 and that forms generally a smooth continuation of the end surface 94 of the housing 14.

The sensor body 70 is mechanically secured to the body 14 via one or more threaded fasteners 100, for example bolts or screws, that extend through the sensor body 70 and into corresponding threaded hole(s) in the body 14. In the illustrated example, a pair of fasteners 100 are used, with the fasteners 100 extending substantially perpendicular to the axis of movement of the piston 24 or perpendicular to the longitudinal axis of the connector 10. The fasteners 100 extend through holes 102 formed in the chip 72. A pair of inverted U-shaped recesses 104 are formed in the sensor body 70 to allow the head end of the fasteners 100 to be recessed relative to the outer curved surface 84.

Figure 5:
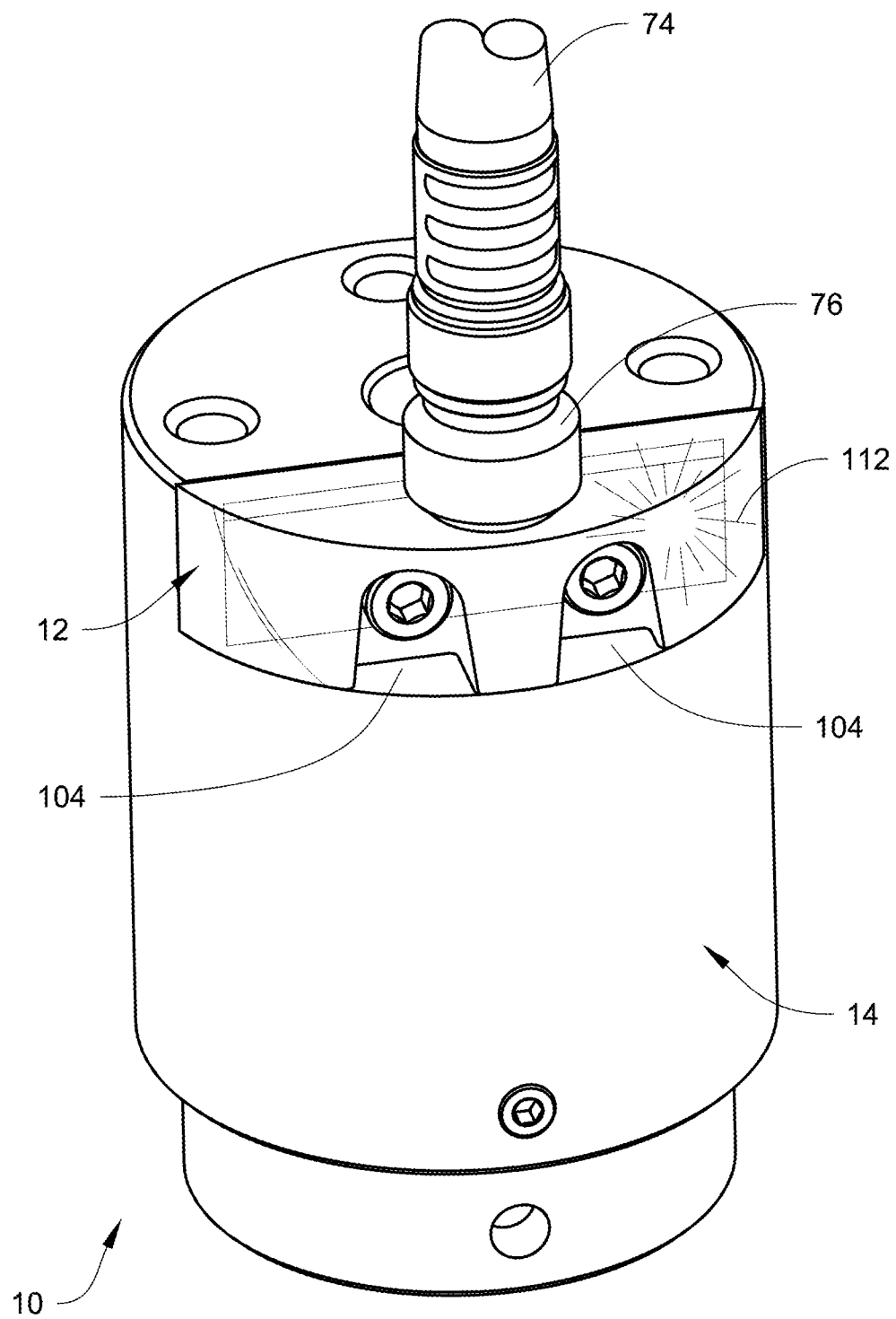
FIG. 5 illustrates viewing of an internal sensor light through a transparent portion of the modular connection state sensor.

Referring to FIG. 4, the chip 72 includes one or more sensing elements 110 that sense the magnet 60. The chip 72 further includes electronics such as a processor, memory and other electronics for implementing the functions of the sensor 12 described herein. In one embodiment, the chip 72 can also include one or more light emitting diodes (LED) disposed thereon for providing a visual indication of the connection state of the connector 10 based on the sensing by the sensing element 110. The LED can be located anywhere on the chip 72 that permits the LED to be viewed by the user. In one embodiment, the LED is visible via a translucent or transparent portion of the sensor body 70. FIG. 5 shows the illumination 112 from an LED that is visible through the sensor body 70. In the example illustrated, the entire sensor body 70 is made translucent or transparent. Some or all of the sensor body 70 of the sensor 12 can be made translucent or transparent to allow viewing of the LED. This allows a user to visually see illumination (or non-illumination) of the one or more LEDs, thereby providing a visual feedback to the user of the connector state, for example whether the connection is good or not.

The sensor body 70 may be made of any materials suitable for use with the connector 10, and to provide the functions of the sensor body 70 described herein. For example, the sensor body 70 may be made of a plastic-based or resin-based material. The chip 72, one or more sensing elements 110, and other electronics can be embedded within the material of the sensor body 70 so that the material intimately encases the components. Alternatively, the chip 72, the one or more sensing elements 110, and other electronics can be disposed within a generally hollowed out interior portion of the sensor body 70.

In operation of the fluid connector 10, the mating part 7 is inserted into the connector 10 (or the connector 10 is inserted onto the mating part 7). Pressurized fluid is then introduced into the cavity 22 through the pilot port 20 to force the piston 24 to the right in FIG. 4, thereby squeezing the seal 52 between the washers 54, 56 which extrudes the seal 52 to seal around and grip on the mating part 7. Once a good seal between the seal 52 and the mating part 7 is achieved, fluid can then be allowed to flow between the fluid connector 10 and the mating part 7, for example through the connector 10 and into the mating part 7, or from the mating part 7 through the connector 10 and out through the port 50 to the first fluid system via the fluid line 5. If the pressurized fluid is removed from the cavity 22, the resiliency of the seal 52 will return to its default or original shape and will force the piston 24 back to its original position.

In addition, once it is determined that a good seal between the seal 52 and the mating part 7 is achieved, the user can zero the connector 10 to define a good connection state based on the corresponding relative positioning of the magnet 60 and the sensor 12 and the resulting signal that is output by the sensor 12. Zeroing can be done in any suitable manner. As the connector 10 is thereafter actuated time and time again, it can be determined that the connector 10 is adequately connected to the mating part 7 once the correct expected signal is received from the sensor 12. If the seal 52 wears, and the piston 24 over travels and/or the piston is not returned back to its initial starting position by the resiliency of the seal 52, the expected signal from the sensor 12 will go bad signifying a problem with the sealing ability. The user would then know when to change the seal 52.

The connection state sensor 12 is modular allowing the sensor 12 to be removed from one fluid connector, such as the fluid connector 10, and mounted on a different fluid connector. For example, the sensor 12 can be used with different ones of the fluid connectors 10 that are similar in construction and function. Alternatively, the sensor 12 can be used with different ones of the fluid connectors 10 that are similar in construction and function but have different sizes to accommodate different fluid systems, different fluid flow rates, or different forms of connection. Alternatively, the sensor 12 can be used with the connector 10, and used with a different type of connector such as the gas cylinder connector described in U.S. Published Application 2017/0037991. The shape of the modular sensor 12 can remain the same when used on different connectors, or the shape of the sensor 12 be changed such that the sensor body thereof can form a generally smooth continuation of one or more portions of outer surfaces of the different fluid connectors the sensor 12 is used with.

The fluid connector 10 is described as using the single magnet 60. However, one or more additional magnets could be mounted to follow the movements of the piston 24, with the movements of the magnets being sensed by multiple sensing elements 110 of the sensor 12, or by sensing elements 110 of different sensors 12 mounted on the fluid connector 10.

In addition, the description describes the magnet 60 as following the movements of the piston 24. However, the movement of one or more of the washers 54, 56 could be sensed by mounting one or more magnets on the washers 54, 56 or by mounting one or more magnets to follow the movements of the washers 54, 56. This could be in addition to or separate from the magnet following the movements of the piston 24.

In addition, in other fluid connectors, other movable parts that are part of a connection mechanism of the fluid connector that detachably connects the fluid connector to the fluid system could be sensed. For example, a magnet could be mounted on, or mounted to follow the movements of, a cylindrical sleeve of the fluid connector.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid connector that detachably connects to a fluid system, comprising:
   a connector housing having a front end, a rear end with an end surface, and an outer surface, the connector housing is made of metal;
   a magnet in the connector housing that is connected to a linearly movable part of the fluid connector so that the magnet is movable with the linearly movable part, the linearly movable part is part of a connection mechanism of the fluid connector that detachably connects the fluid connector to the fluid system; and
   a modular connection state sensor body detachably mounted on the connector housing using one or more bolts or screws, the modular connection state sensor body including a sensing element that is positioned to sense movements of the magnet, and the modular connection state sensor body includes at least one surface that forms a continuation of the end surface or of the outer surface, at least a portion of the modular connection state sensor body is transparent or translucent, and a light emitting diode within the modular connection state sensor body adjacent to the transparent or translucent portion thereof, and the modular connection state sensor body is made of plastic.

2. The fluid connector of claim 1, wherein the linearly movable part comprises a piston of the fluid connector.

3. The fluid connector of claim 1, wherein the modular connection state sensor body includes a surface that forms a continuation of the end surface and a surface that forms a continuation of the outer surface.

4. A method, comprising:
   detachably connecting a modular connection state sensor body to a first fluid connector having a first connector housing with a first front end, a first rear end with a first end surface, and a first outer surface; a first magnet in the first connector housing that is connected to a first linearly movable part of the first fluid connector so that the first magnet is movable with the first linearly movable part, the linearly movable part is part of a first connection mechanism of the first fluid connector that detachably connects the first fluid connector to a fluid system; the modular connection state sensor body including a sensing element that is positioned to sense movements of the first magnet; and the modular connection state sensor body includes at least one surface that forms a continuation of the first end surface or of the first outer surface;
   detachably connecting the first fluid connector to a fluid system using the first connection mechanism;
   processing fluid through the first fluid connector;
   thereafter disconnecting the first fluid connector from the fluid system by disconnecting the first connection mechanism;
   thereafter detaching the modular connection state sensor body from the first fluid connector; and
   thereafter detachably connecting the modular connection state sensor body to a second fluid connector having a second connector housing with a second front end, a second rear end with a second end surface, and a second outer surface; a second magnet in the second connector housing that is connected to a second linearly movable part of the second fluid connector so that the second magnet is movable with the second linearly movable part, the second linearly movable part is part of a second connection mechanism of the second fluid connector that detachably connects the second fluid connector to a fluid system; the sensing element is positioned to sense movements of the second magnet; and the at least one surface of the modular connection state sensor body forms a continuation of the second end surface or of the second outer surface.

5. The method of claim 4, wherein the first fluid connector and the second fluid connector have the same construction and function.

6. The method of claim 4, wherein the first fluid connector and the second fluid connector are different from one another in construction and function.

* * * * *